J. H. Jennings,
Mosquito Net,
Nº 53,149. Patented Mar. 13, 1866.
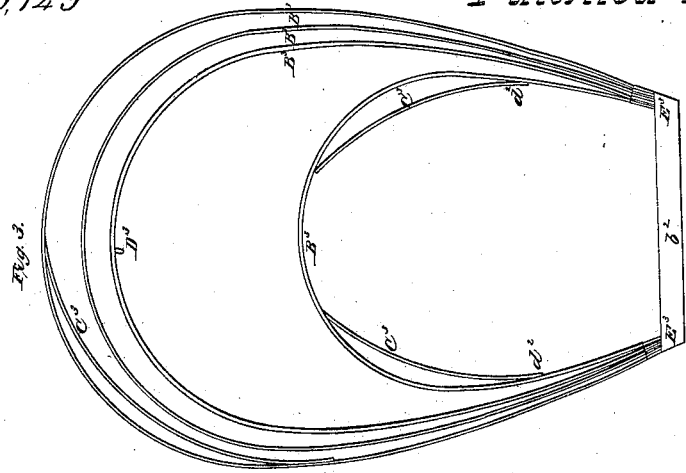
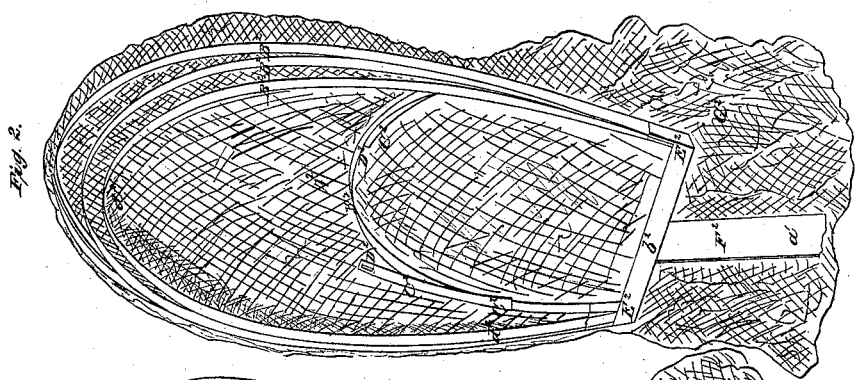
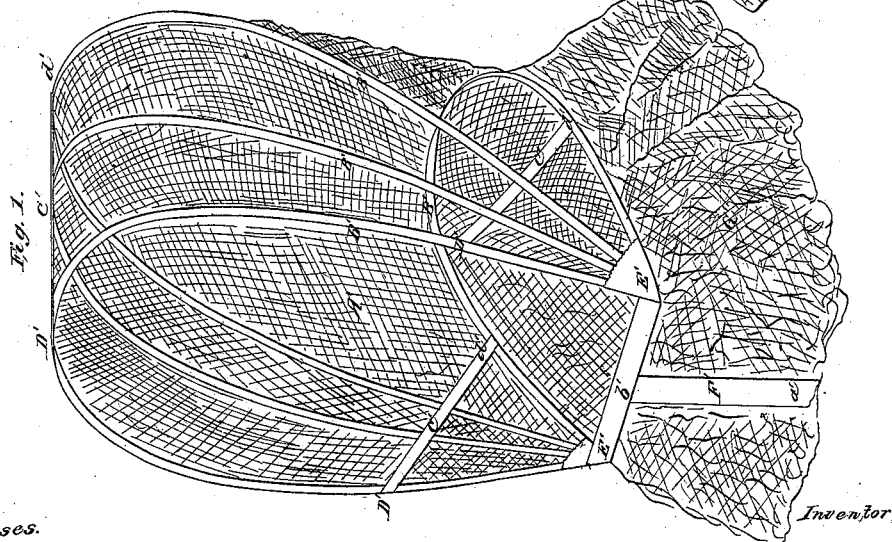
Witnesses.
Th. E. T. White
Ozro H. Parker
Inventor,
John Henry Jennings

UNITED STATES PATENT OFFICE.

J. HENRY JENNINGS, OF NEW BEDFORD, MASSACHUSETTS.

IMPROVED FLY AND MOSQUITO BAR.

Specification forming part of Letters Patent No. 53,149, dated March 13, 1866.

*To all whom it may concern:*

Be it known that I, JOHN H. JENNINGS, of New Bedford, in the county of Bristol and State of Massachusetts, have invented a Portable Fly and Mosquito Bar; and I do hereby declare that the following is a full and exact description thereof, reference being had to the accompanying drawings, and to the letters of reference marked thereon.

My invention consists in an elastic bow-frame, with braces similar to the bows and braces of a carriage top, covered with mosquito-bar netting or similar material, and designed to be worn over the head.

Figure 1 is a perspective view of my invention. Fig. 2 is a perspective view with the bows and braces folded to render it portable. Fig. 3 is a view of the frame and braces with the netting removed.

Fig. 1: $A'$ is the netting secured to the bows $B' B' B' B'$. $C' C' C' C'$ are braces secured in hinge-joints to $B' B' B'$ at $d' d' d'$. $D' D' D'$ are metallic buttons, the heads of which are flattened like the heads of thumb-screws, so they may be inserted through the apertures in the braces. $E' E'$ are hinge-joints. $F'$ is an elastic ribbon with a button-hole at $a'$. $b'$ is a tape-bar secured to $B'$, &c., at $E' E'$, and prevents the bows from spreading. $G'$ is a frill to prevent the insects from getting under the bar.

Fig. 2: $A^2$ the netting shown by $A'$ in Fig. 1; $B^2$, &c., the bows; $C^2$, &c., the braces; $D^2$, &c., the apertures through which the flattened heads of the buttons are inserted, (see $D'$, &c., Fig. 1.) $E^2 E^2$ are joints, (shown by $E'$ in Fig. 1;) $F^2$, elastic; $G^2$, frill; $a^2$, button-hole in elastic; $b^2$, tape; $c^2$, hinge-joint; $d^2$, buttons.

Fig. 3: $B^3$, &c., bows; $C^3$, braces; $D^3$, buttons; $E^3$, joints, &c.

The portable fly and mosquito bar herein described, being constructed as shown in Fig. 1, with bows and braces adjusted and secured in their proper places, as also shown, and affixed over the head and secured to the wardrobe by means of the elastic, its novelty and utility will be apparent without any further specification.

I do not confine my invention to any particular size or to wearing it over the head as herein specified. It may be constructed sufficiently large to cover a bed or cradle or sufficiently small to be worn on the hands. Neither do I confine it to securing the braces with buttons. They may be secured in pockets at either end, or in any other practical manner. Neither do I claim or desire to claim any device previously invented or patented for mosquito-bar; but What I do claim as my invention, and desire to secure by Letters Patent, is—

A portable hinged and fold-up fly and mosquito bar guard or net, composed of the bows, bars, hinges, and fastenings, constructed substantially as and for the purpose herein set forth and described.

J. HENRY JENNINGS.

Witnesses:
TH. E. M. WHITE,
OZRO. H. PARKER.